United States Patent
DeMartin et al.

(10) Patent No.: US 6,421,527 B1
(45) Date of Patent: Jul. 16, 2002

(54) SYSTEM FOR DYNAMIC ADAPTATION OF DATA/CHANNEL CODING IN WIRELESS COMMUNICATIONS

(75) Inventors: Juan-Carlos DeMartin, Richardson; Alan V. McCree; Krishnasamy Anandakumar, both of Dallas, all of TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/311,008

(22) Filed: May 13, 1999

Related U.S. Application Data

(60) Provisional application No. 60/086,217, filed on May 21, 1998.

(51) Int. Cl.$^7$ ................................................ H04Q 7/20
(52) U.S. Cl. .................... 455/67.3; 455/63; 455/501; 455/226.3; 375/227
(58) Field of Search ................................ 455/67.3, 67.7, 455/63, 501, 423, 9, 560, 226.3, 517, 466, 422, 426, 67.1; 375/227, 225, 222

(56) References Cited

U.S. PATENT DOCUMENTS

| | | | | |
|---|---|---|---|---|
| 4,939,731 A | * | 7/1990 | Reed et al. ................. | 455/466 |
| 5,818,826 A | * | 10/1998 | Gfeller et al. .............. | 370/342 |
| 5,839,077 A | * | 11/1998 | Kowaguchi ................. | 455/67.3 |
| 5,857,147 A | * | 1/1999 | Gardener et al. ........... | 455/67.3 |
| 5,923,679 A | * | 7/1999 | Itoh et al. ................... | 455/67.3 |
| 6,108,374 A | * | 8/2000 | Balachandran et al. .. | 455/226.3 |
| 6,141,388 A | * | 10/2000 | Servais et al. ............. | 455/67.3 |

* cited by examiner

Primary Examiner—William Trost
Assistant Examiner—Keith Ferguson
(74) Attorney, Agent, or Firm—Robert L. Troike; Frederick J. Telecky, Jr.

(57) ABSTRACT

A system for dynamic adaptation of wireless communication between a Mobile Station (11) and a Base Station (13) wherein the transmitted frame from the Mobile Station includes a convolutionally coded portion containing a down-link measurement bit and a repetition code identifying the codec mode of the frame. The transmitted frame from the Base Station (13) includes a codec mode command signal for the Mobile Station (11) in the convolutionally encoded portion and the repetition code identify the codec mode of the down-link frame. The Base Station (13) includes means for analyzing the quality of the up-link frame and means from the received down-link measurement bit for determining the down-link quality.

4 Claims, 2 Drawing Sheets

SYSTEM FOR DYNAMIC ADAPTATION OF DATA/CHANNEL CODING IN WIRELESS COMMUNICATIONS

This application claims priority under 35 USC §119(e)(1) of provisional application No. 60/086,217, filed May 21, 1998.

TECHNICAL FIELD OF THE INVENTION

This invention relates to wireless communications and more particularly to a system for dynamic adaptation of data/channel coding.

BACKGROUND OF THE INVENTION

Transmission of digitally encoded speech over wireless channels in a cellular environment usually requires the use of error control techniques to combat the noisy nature of such channels. In cellular applications, however, the characteristics of the channel are highly non-stationary, that is, periods of relatively error-free signal alternate with periods of strongly deteriorated signal. The traditional solution to this problem is to allocate to error detection and correction enough bandwidth to deal with the "average channel", sacrificing optimality for the two extreme cases of good and bad channels.

This static approach is clearly not optimal: in good channel conditions most of the resources employed by error control are redundant, and could be better used to increase the speech quality, while in bad channels, error control should be reinforced by using resources made available by a lower bit rate speech codec. Moreover, the cellular channel is quite bipolar, that is, oscillates in time between good and bad channels, passing only a fraction of the time of a call in the "average channel" condition for which the static solution was designed. Unequal Error Protection is used in most cellular standards. In Unequal Error Protection, speech bits are divided into classes of decreasing perceptual importance and each class is encoded with appropriate rates of protection including no protection. Although the Unequal Error Protection approach used in most cellular standards somewhat mitigates the flaw of using the "average channel" approach, a better solution is desirable.

SUMMARY OF THE INVENTION

In accordance with one embodiment of the present invention, a system is presented that allows one station to communicate with a second station. The station monitors the quality of the channels connecting them and adapts their data and error control rates accordingly.

DESCRIPTION OF PREFERRED EMBODIMENTS OF THE PRESENT INVENTION

In the present invention, a system for dynamic adaptation of speech/channel coding to the varying conditions of wireless channels in a cellular environment is presented. In an adaptive system, the ratio between speech bits and error control bits changes as a function of the condition of the channel.

In the present invention, there is more error control and less speech bits in bad channels, and more speech bits and less error control in good channels, where error control is less needed.

In accordance with the present invention, the up-link and down-link codec modes are dynamically changed to account for the estimated error rates on the up-link and down-link. To implement an adaptive system and, more specifically, one that is in accordance to the requirements of the new Global System for Mobile Communications (GSM) Adaptive Multi-Rate (AMR) system as specified by European Telecommunication Standards Institute (ETSI), we also need to send in-band information and a mode indicator.

In a preferred embodiment of the present invention, the adaptation control is located in the Base Station (BS).

Figure 1:
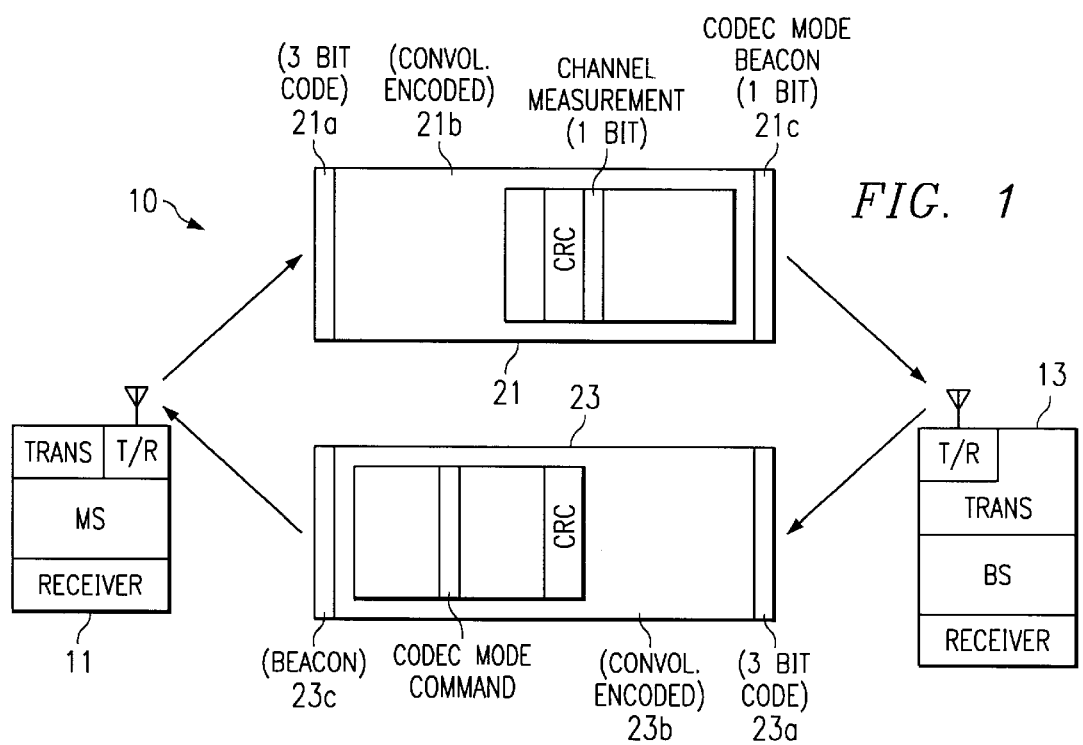
FIG. 1 is an overall block diagram of the system in accordance with one embodiment of the present invention.

Dynamic switching requires the transmission of two different kinds of in-band information: a channel measurement of the quality of the down-link channel, sent via the up-link, that is, from Mobile Station (MS) 11 to Base Station (BS) 13; and a codec command sent via the down-link, that is from Base Station (BS) 13 to Mobile Station (MS) 11 (see FIG. 1). The former describes how good the down-link channel is, the latter is the codec mode that the Mobile Station (MS) 11 encoder is asked to use.

The objective is to send this information accurately and frequently enough to make the adaptation mechanism work effectively, but using as few bits as possible, to minimize overhead.

We have chosen to send the in-band information for both directions in every frame (20 ms), using a single bit. This in-band information bit is placed in Class 0, to achieve maximum protection. Class 0 is the most channel protected subset of information bits.

One substantial problem of an adaptive system is that the channel decoder has to know which mode had been used to encode the frame before it can successfully decode it. Several solutions have been considered, the simplest to understand and implement being that of attaching a header to the convolutionally encoded frame as presented herein. Prior to channel decoding, the header is decoded and the mode extracted, allowing the decoding of the rest of the frame. A specific implementation of this approach is a repetition code with a novel decoding scheme.

A relatively simple solution to the mode indicator problem is to code the mode with a 3-bit repetition code: Mode 0 is represented by the codeword '000', while Mode 1 by '111'. Such codeword is sent together with the convolutionally encoded data and represents a header that the channel decoder reads in order to determine how to decode the convolutionally encoded part of the frame. Traditional majority-vote decoding of a 3-bit repetition code would not perform well enough in the kind of channels we are dealing with, where the bit error rate can be 19% or more. Using more bits, however, would diminish the number of bits available for speech or for error control. In order to minimize the overhead, applicants, in accordance with one embodiment, decode the repetition code taking advantage of the characteristics of the information represented by the sequence of modes, a slowly varying, highly correlated sequence of just two modes. With such decoding, which is referred herein as "unanimous decoding", the mode is changed only if a unanimous codeword is received, i.e., '000' or '111'. Such codewords can only be the result of no errors or three errors on the channel. All the remaining codewords, caused by all the possible combinations of 1 and 2 errors, are ignored, leaving the mode unchanged. Erroneous decoding is still possible, it will happen every time that we have three errors, but it can be shown that it is a relatively rare occurrence even in very bad channels, and anyway it results, because of the CRC protection (parity discussed later), in a frame repeat, which often goes unheard. On the other hand, unanimous decoding could slow down a mode change, since it is based on the assumption that a mode change is unlikely, but it can be shown that the probability of making the transition to the right mode within three frames is very high even in bad channels. In short, a traditional repetition code decoded in a novel way allows good performance in a time-varying channel with a minimum amount of overhead (3 channel bits). If even higher switching performance is needed, the system can be straightforwardly extended to use 4 or more bits.

Referring to the system 10 of FIG. 1, a cellular Mobile Station (MS) 11 comprising a transmitter, a receiver, an antenna and transmit/receive control switch (TR) transmits a packet frame 21 to a Base Station (BS) 13. The packet frame 21 is made of three parts or subsets. The first and main part or subset 21b is the speech bits, parity bits, and in-band information all convolutionally encoded. A second part or subset 21a is the 3-bit codec mode header discussed above. The third part or subset 21c is a 1-bit codec mode beacon (explained later). The Base Station 13 includes a transmitter, a receiver, and an antenna system for transmit and receive. The Base Station 13 determines the best speech and channel coding combinations for both the up-link and the down-link. It then creates a frame 23 using the appropriate mode for the down-link. The frame 23 is made of the same three parts: the subset of the convolutionally encoded section 23b, the codec header 23a and codec mode beacon 23c. The convolutionally encoded subset 23b includes a codec mode command for the up-link as part of the in-band information. The Base Station (BS) 13 receives the frequencies of the channel used by the Mobile Station (MS) 11 and the Mobile Station (MS) receives the frequencies of the channel used by the Base Station (BS) 13. The system 10 can change the source and channel bit rates to adapt to the quality of the channels. The present invention does this in accordance with the constraints and requirements for the new Global System for Mobile Communications (GSM) Adaptive Multi-Rate (AMR) system as specified by European Telecommunication Standards Institute (ETSI).

In the new GSM AMR, there are two channel modes, full rate or half rate. In the full rate, there are 456 bits per frame at an overall bit rate of 22.8K bits per second. In the half rate, there are 228 bits per frame at an overall bit rate of 11.4K bits per second. Within each of the two channel modes (full rate or half rate) there are in the present embodiment two different speech/error control combinations. These are the codec modes. With the full rate there are two options. For a bad channel, the codec mode is Mode 0 and the source coding rate for speech is 7.45 Kb/sec. For the good channel, the codec mode is Mode 1 and the source coding rate for speech is 11.85 Kb/sec. The rest of the bits are used for in-band signaling, channel coding, codec mode header and codec mode beacon. The channel coding adds redundancy to correct for bit errors. For the half rate there are two options. For a bad channel, the codec mode is Mode 0 and the source coding rate is 5.15 Kb/sec. For the good channel, the codec mode is Mode 1 and the source coding rate is 7.45 Kb/sec.

Figure 2:
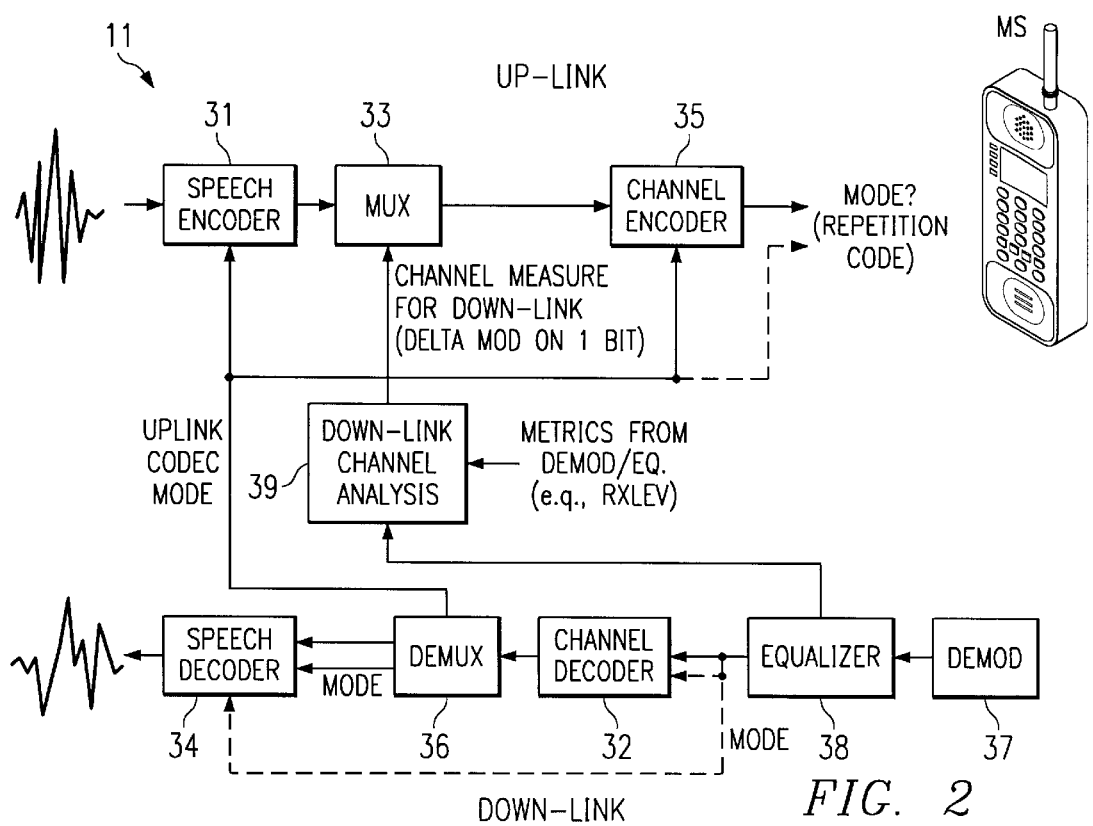
FIG. 2 is a block diagram of the mobile station.

Referring to FIG. 2, there is illustrated the Mobile Station (MS) 11 according to one embodiment of the present invention. The up-link input speech is sampled/digitized and encoded with the up-link codec mode in encoder 31. The speech/data bits are multiplexed with a down-link channel measurement bit from down-link analyzer 39 in multiplexer 33 and the multiplexed speech bits and channel measurement bit output is applied to the channel encoder 35. The channel encoder is operated at the codec up-link mode received via the down-link from the Base Station 13.

Speech bits are divided into classes of decreasing perceptual importance. Each class is then encoded with convolutional codes of appropriate rate (including, possibly, rate 1, i.e., no protection). The first class, Class 0, includes the most important bits. On the up-link frame, the bits are protected by a Cyclic Redundancy Code (CRC) parity check. A CRC parity check is computed over the bits of Class 0 to detect any error at the receiver. At the receiver, the received CRC is compared to the CRC computed over the received bits: if they are equal, all bits in Class 0 are assumed to be correct. The down-link channel measurement bit (1 bit) is part of Class 0 and therefore has the CRC protection. With no convolutional encoding and no error detection, we have the codec mode identifier (repetition code) 21a. This identifier 21a is sent as header information and for the example is the repetition code discussed above. We also have the codec mode beacon (1-bit channel) 21c described later. Everything else is channel coded which in this case means that a convolution code with different levels of redundancy for every bit of information is used. This is what the Mobile Station (MS) 11 is transmitting. The channel encoded information 21b, the codec mode header 21a and beacon bit 21c are sent in the frame 21. They are modulated on the RF carrier of the mobile transmitter.

Figure 3:
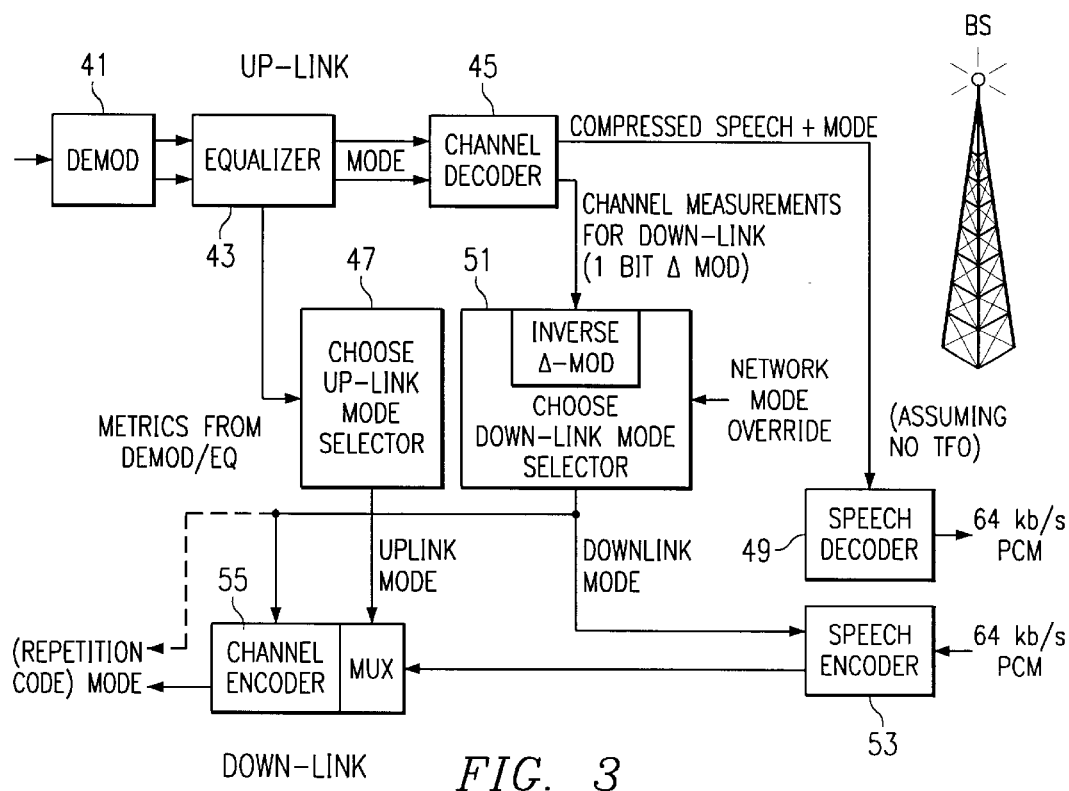
FIG. 3 is a block diagram of the base station.

Referring to FIG. 3, the Base Station (BS) 13 antenna system picks up the radiated packet frame signal and down converts to the base band signal which is detected at demodulator 41 and the analog signal is sampled back to digital bits, for example, in maximum likelihood equalizer 43. The receiver recognizes the header 21b 3-bit (repetition code for example) code and knows the codec mode to use for the frame. The equalizer 43 makes a decision as to whether a logic 1 or zero and passes the result to the channel decoder 45. The reliability of the received bits is reflected by their soft values, a number, for example, between −127 and +127 that is directly proportional to the probability of error. If the bits are strongly 1, the value is close to +127. If the bits are strongly 0, the value is close to −127. All the intermediate values reflect a lesser degree of confidence. This level of confidence is used to choose the up-link mode at up-link mode select 47.

A suitable moving average of the soft-values is a good estimator of the current Carrier to Interference (C/I) Ratio of the channel, a parameter which is directly connected to the amount of errors introduced by the channel. The aim of the mode selector, for both up- and down-link, is to follow the C/I profile faithfully and quickly enough to allow a good mode adaptation between the two available modes.

Figure 4:
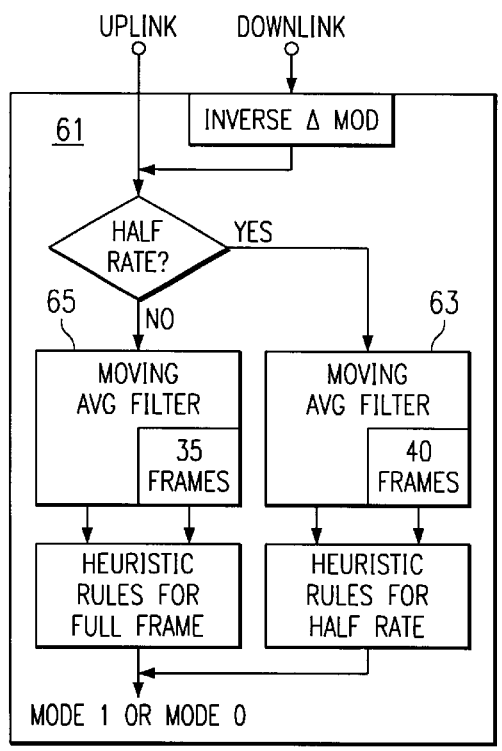
FIG. 4 is a block diagram of the mode selector in the base station.

Two different sets of thresholds have been chosen for the specific case of the GSM half- and full-rate channel modes. For the half-rate case, the absolute values of the soft-bits for the current frame are averaged together and the resulting value is then fed to a moving average filter 63 of memory size 40 (See FIG. 4). The filter 63 averages over 40 frames. The output of the filter, called "average value", is then used to estimate the current C/I value and consequently the most suitable mode to be used for the up-link. The mode is chosen according to a number of heuristic rules:

If average value <120, change to mode 0 (the mode with greater error control protection);

If average value and previous one is >126, switch to mode 1 (the mode with less error protection);

If the last 30 values of average values >124, switch to mode 1.

For the full-rate case, the memory of the moving average filter 65 is over 35 frames. The rules are:

If average value <104, change to mode 0 (the mode with greater error control protection);

If average value >113, switch to mode 1 (the mode with less error protection).

These rules intend to induce a mode switch between 16 and 13 dB C/I for the half-rate, and between 10 and 7 dB C/I for the fill-rate in the present embodiment.

As stated previously, the codec mode used for a given frame is sent outside the convolutionally encoded part of the frame in a header. This header is decoded (by the unanimous decoder for example) and used to select the codec mode for the channel decoder 45. The compressed speech and the mode are sent to the speech decoder 49 for decoding the speech at, for example, 64 kb/sec pulse code modulation (PCM). This is sent out at this rate to the user to which the call is addressed. The quantized down-link channel measurement bit sent by the Mobile Station 11 in-band information via the up-link frame 21 is decoded by the channel decoder 45 as part of Class 0 and provided to the down-link mode selector 51. This information is used to select the appropriate codec mode at the speech encoder 53 and channel encoder 55. Upon reception of this information, the Base Station 13 performs inverse Delta Modulation quantization, obtaining the quantized "average value" described in the up-link. The same heuristic rules are applied for mode decision as in the up-link mode selector. In the present embodiment of the invention, the Delta Modulation is set up slightly different between half and full rate. The quantization step size is 3 in the first case and 2 in the second. The mean is 80 in the first and 90 in the second. The codec mode may be overridden at the base station by the network mode override. The down-link codec mode is also sent outside the convolutionally encoded part of the frame as a header to the mobile station 11. The 64 kb/s PCM speech bit/data bits is applied to the speech encoder 53 which encodes the speech at the down-link codec mode selected at selector 51. The encoder 53 output is multiplexed with the codec mode command bit from up-link selector 47 and the combination is convolutionally encoded, with the codec mode command bit in the Class 0 protected by the CRC, as explained before. The channel encoder 55 is operated at the down-link codec mode as determined at the selector 51. The repetition code identifying the down-link codec mode is sent outside the convolutionally coded frame as a header 23a. The frame 23 with header 23a and codec beacon bit 23c are up converted to the down-link frequency of the Base Station (BS) 13. At the Mobile Station 11 this down-link frequency signal is picked up at the mobile antenna and down converted to base band. The frame 23 with convolutionally coded subset 23b, header 23a and beacon bit 23c is demodulated at demodulator 37 and the codec mode of the header 23a is decoded and applied to the channel decoder 32 and speech decoder 34. The demodulator 37 output is applied to a maximum likelihood equalizer 38 which makes a decision as to whether a logic 1 or logic 0 and provides a reliability based on the soft values between, for example, −127 and +127 that is directly proportional to the probability of error. The soft values are fed to the channel analysis 39 where their absolute values are averaged over the frame. This measure is encoded with Delta Modulation (change) in a measurement bit which is applied to multiplexer 33 to be sent to the Base Station 13 and used at down-link mode selector 51 as discussed previously. The channel decoder 32 output is applied to the demultiplexer 36 where the up-link codec mode command bit (1 bit) is removed and applied to the speech encoder 31 and channel encoder 35 for encoding at the command codec mode rate determined at the base station 13. The down-link speech is decoded at decoder 34.

The command bit from the Base Station (BS) 13 commanding the Mobile Station (MS) 11 to change the codec mode to change the rate is done by variable-length coding. The entire code word is not transmitted at once. If the bit is 0 you know to use mode 0. If you get a "1" and then in the following frame a "0", then you switch to mode 1. If it stays 0, you stay in mode 0. It also allows more codes.

A minimum amount of overhead is possible by the adoption of a variable-length, suffix coding scheme for the codec mode and of differential coding for the channel measurement.

TABLE 1

| CODEC_MODE: | |
|---|---|
| AMR Mode 0 (FR) | 0 |
| AMR Mode 1 (FR) | 10 |
| AMR Wideband 0 | 110 ⎤ |
| AMR Wideband 1 | 1110 |
| GSM FR (full rate) | 11110  Extended Modes |
| GSM EFR (enhanced full rate) | 111110 |
| GSM HR (half rate) | 1111110 ⎦ |

Note that this variable-length solution has the advantage of being expandable at will. The delay is significant, several frames, only for Extended Modes (EM), which should be fine, since a fairly slow switch to EM's should be in line with current GSM practice in the context of Tandem Free Operations (TFO).

Channel Measurement

It may be desirable to use mean-removed Delta Modulation quantization for channel measurement. The 1-bit mean-removed Delta Modulation quantizer has fixed prediction coefficient of for example a coefficient=0.95.

The quantized channel measures give an indication of how good the channel is, like channel grade 0, channel grade 1, channel grade 2 or channel grade 3.

Codec Mode Beacon Bit for Extended Modes

The requirement for extended modes poses several problems. It seems clear that a full solution allowing switching from a mode to any other mode (say, from AMR mode 0 to GSM EFR) at every frame is not necessary. What seemed necessary is, instead, a signaling solution capable of handling switching to an extended mode at a reasonable speed and with good robustness.

Again, we looked for a solution with the lowest bit rate impact possible. We chose to add a single Codec Mode Beacon (CMB) (1 bit) to the bitstream. This bit, through the same variable-length code used for the in-band information, keeps repeating the codec mode currently in use, working like a color-coded lighthouse beam. Since the bit goes into the channel unprotected, the beam is often shadowed and misinterpreted, but in time the message gets through correctly.

When working with AMR modes, the bit is generally disregarded. When switching to one of the extended modes, instead, the CMB performs an anti-lock function.

For an Extended Mode, the mobile station (MS) 11 recognizes the in-band codec mode command in the coded subset 23b and switches to the corresponding Extended Mode (EM) (see FIG. 1 and Table 1). As described above, the Base Station (BS) 13 periodically tells the Mobile Station (MS) encoder which codec mode to use, and does so through the codec mode in-band information (via the downlink). When the command to switch to an EM is received, the mobile station (MS) 11 encoder 31 will process the next speech frame with the corresponding mode, and the mobile station (MS) 11 decoder 32 will decode the next frame coming from the base station (BS) 13 with the same mode. With error-free channels, this scheme would work correctly, allowing to switch back and forth between AMR and Extended Modes (please remember that EMs will have appropriate channel coding and in-band signaling). However, since the channel is error prone, we need a way to make sure that the decoders, both on the Mobile Station (MS) 11 and on the Base Station (BS) 13, will not enter a crash state of continuous decoding of frames coded with a mode different from the one considered correct.

The CMB provides lock-breaking protection. After a switch, the MS/BS decoder will start monitoring the CRC behavior; if it is decoding the wrong mode, a continuous string of frame repeats will be observed. After a number of them (such as ten, for example), the decoder will start paying attention to the CMB, in order to determine the actual mode being used by the encoder. Since, over time, even an unprotected CMB will convey the right mode information, the decoder will be able to resynchronize itself with the mode used by the encoder.

Change to a different mode, either EM or AMR, will be possible through the in-band information included in the bit stream of the EMs themselves.

To improve robustness, the switch to an EM can be made only after the successful reception of more than one appropriate codec mode commands.

What is claimed is:

1. A wireless communication system comprising:
    a Mobile Station and a Base Station adapted to transmit and receive a communication signal frame containing data and error control from each other; said frame including a header with a unanimous repetition code identifying the codec mode of the transmitted frame and a convolution encoded subset including speech coding with different level coding and parity; said Mobile Station and said Base Station including a unanimous bit decoder for identifying the codec mode of the header with the repetition code; said frame includes an extra codec mode beacon code out of band to guarantee mode switching for additional robustness.

2. A wireless communication system comprising:
    a Mobile Station and a Base Station adapted to transmit and receive a communication signal frame containing data and error control from each other; said frame including a header with a unanimous repetition code identifying the codec mode of the transmitted frame and a convolution encoded subset including speech coding with different level coding and parity; said Mobile Station and said Base Station including a unanimous bit decoder for identifying the codec mode of the header with the repetition code; said Mobile Station and said Base Station are adapted to transmit and receive a communication signal frame containing data and error control from each other; said frame from said Mobile Station to said Base Station containing downlink channel measurement using delta modulation; and said frame from said Base Station to said Mobile Station includes a codec mode command with a variable suffix code with one bit sent per frame.

3. A wireless communication system comprising:
    a mobile station and a base station adapted to transmit and receive a communication signal frame containing data and error control from each other; said frame from said mobile station to said base station containing downlink channel measurements using delta modulation; said base staton performing inverse delta modulation quantization; and said frame from said base station to said mobile station includes a codec mode command with a variable suffix code with one bit sent per frame.

4. The method of claim 3 wherein said frame includes an extra codec mode beacon code out of band to guarantee mode switching for additional robustness.

* * * * *